(12) United States Patent
Koeppl et al.

(10) Patent No.: US 7,474,071 B2
(45) Date of Patent: Jan. 6, 2009

(54) ELECTRIC MOTOR REGULATION WITH CONTROLLED ERROR INTERCEPT

(75) Inventors: Benno Koeppl, Markt Indersdorf (DE); Georg Lipperer, Haar (DE)

(73) Assignee: Infineon Technologies AG, Munich (DE)

( * ) Notice: Subject to any disclaimer, the term of this patent is extended or adjusted under 35 U.S.C. 154(b) by 294 days.

(21) Appl. No.: 11/533,026

(22) Filed: Sep. 19, 2006

(65) Prior Publication Data

US 2007/0069674 A1    Mar. 29, 2007

(30) Foreign Application Priority Data

Sep. 19, 2005   (DE)   ........................ 10 2005 044 629

(51) Int. Cl.
*B62D 5/04*   (2006.01)
*H02P 7/00*   (2006.01)

(52) U.S. Cl. ........................ 318/489; 318/254; 318/432; 318/434; 180/443; 180/446; 701/41; 701/43

(58) Field of Classification Search ................. 318/254, 318/432, 434, 489; 180/443, 444, 4; 701/41, 701/43

See application file for complete search history.

(56) References Cited

U.S. PATENT DOCUMENTS

| | | | |
|---|---|---|---|
| 4,869,334 A | 9/1989 | Marumoto et al. | |
| 5,107,425 A | 4/1992 | Donges et al. | 364/424.03 |
| 5,912,539 A * | 6/1999 | Sugitani et al. | 318/434 |
| 6,704,632 B2 * | 3/2004 | Itoh | 701/43 |
| 6,741,053 B2 | 5/2004 | Kifuku et al. | 318/432 |
| 6,795,762 B2 * | 9/2004 | Itoh et al. | 701/43 |
| 6,992,449 B2 * | 1/2006 | Iwami et al. | 318/432 |
| 7,091,684 B2 * | 8/2006 | Kobayashi et al. | 318/432 |
| 7,157,874 B2 * | 1/2007 | Nomura et al. | 318/432 |
| 7,178,474 B2 * | 2/2007 | Warnes | 114/125 |
| 7,202,621 B2 * | 4/2007 | Tsunoda | 318/434 |
| 7,207,412 B2 * | 4/2007 | Uryu | 180/443 |
| 7,289,109 B2 * | 10/2007 | Jaeger | 345/173 |
| 7,294,988 B2 * | 11/2007 | Ajima et al. | 318/712 |
| 7,341,125 B2 * | 3/2008 | Yamamoto | 180/446 |
| 7,385,365 B2 * | 6/2008 | Feick | 318/400.01 |
| 2003/0155879 A1 | 8/2003 | Kifuku et al. | |

FOREIGN PATENT DOCUMENTS

| | | |
|---|---|---|
| DE | 3825280 | 2/1990 |
| DE | 10244999 | 11/2003 |
| WO | 2005/061304 | 7/2005 |

\* cited by examiner

*Primary Examiner*—Paul Ip
(74) *Attorney, Agent, or Firm*—Eschweiler & Associates, LLC

(57) ABSTRACT

A motor is controlled by a motor control signal so that it reaches a target state, which is derived from sensor data sensed by a sensor. The motor can be put into a rest state at the occurrence of an error in simple and efficient manner by means of a safety means generating an alternative motor control signal at the occurrence of the error. Thus, the underlying idea is, instead of redundantly embodying components, to consciously accept a failure and integrate a corresponding fall-back solution into the overall concept. The failure is detected, and the motor is switched off in a user-manageable manner by a targeted shutdown.

28 Claims, 6 Drawing Sheets

ELECTRIC MOTOR REGULATION WITH CONTROLLED ERROR INTERCEPT

PRIORITY

This application claims priority from German Patent Application No. DE 10 2005 044 629.9, which was filed on Sep. 19, 2005, and is incorporated herein by reference in its entirety.

TECHNICAL FIELD

The present invention concerns the error handling in the drive of electric motors, and particularly a concept to put a motor into a target state in a controlled manner at the occurrence of an error.

BACKGROUND

In numerous industrial applications, actuating or drive processes are executed by regulated electric motors. The failure of such a motor or of its regulation, which entails the immediate standstill of the motor, is often not tolerable due to safety considerations. For example, the abrupt failure of a coolant pump may induce strong local heating of a device to be cooled, so that there is a fire hazard. Among other things, this hazard is increased by the fact that at an abrupt failure of the coolant pump there is no time available to take potential countermeasures, i.e. suspend machining in the case of heat-generating machining of a material piece.

Modern steering assistance means or power steerings in motor vehicles are based on torque assistance made available by a regulated electric motor. In the current EPS (electrical power steering) systems, the steering assistance is turned off suddenly (in the range of a few milliseconds) in the event of an error (e.g. the failure of a component). Such a sudden failure of the steering assistance is extraordinarily dangerous, because the driver is surprised and cannot adjust to the changed situation any more, whereby life-threatening driving situations may arise.

The above-mentioned problems are usually countered by redundantly embodying the regulation or motor systems. In the case of maximum redundancy, every individual system member, i.e. the electric motor itself and the regulation, which may include several sensor or computing elements cross-linked with each other, has to be embodied twice. In a power steering, it is the aim to maintain the steering assistance active as long as possible and additionally compensate for the failure of one or more components.

Apart from the obvious disadvantage of an increase in costs and the overall weight caused by the system, an extremely relevant factor in the automobile industry, the system complexity, is significantly increased by the redundant design. The hand-over of a faulty system function from a main system to a redundantly available backup system is an extremely complex process, because this transition has to take place in the running system without compromising the stability and functioning of the system. In order to make this possible, it is often even necessary to integrate new, additional components or sensors into the system, so that the transition from the main to the backup system can be ensured by means of additional locked loops or hand-over algorithms.

SUMMARY

According to one embodiment, a motor control apparatus for controlling a motor, may have: a sensor for outputting sensor data; a controller for determining a target state of the motor depending on the sensor data, and for generating a motor control signal for controlling the motor depending on a deviation of a current state of the motor from the target state, to approximate the current state of the motor to the target state; a monitor for outputting an error signal at an error of the sensor or the controller; and a safety controller for generating, at the occurrence of an error signal, an alternative motor control signal suited to put the motor into a rest state in a controlled manner.

BRIEF DESCRIPTION OF THE DRAWINGS

These and other objects and features of the present invention will become clear from the following description taken in conjunction with the accompanying drawings, in which.

DETAILED DESCRIPTION

Figure 1:
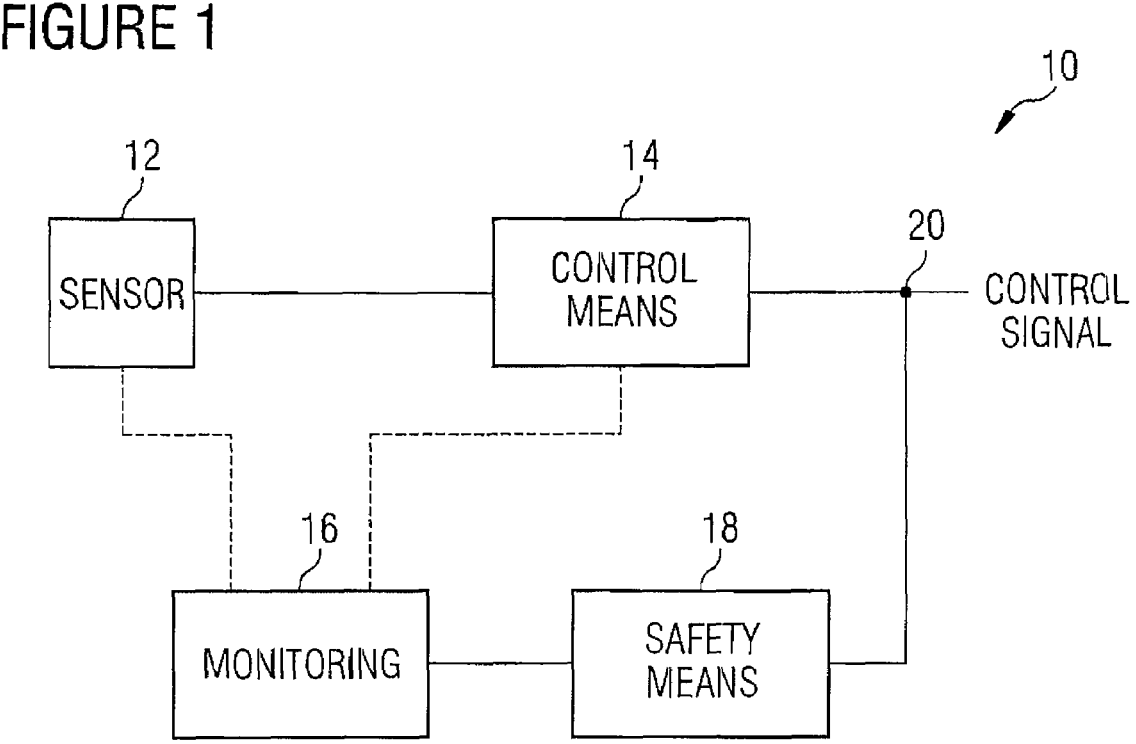
FIG. 1 is a motor control means for controlling an electric motor.

According to another embodiment, a method of controlling a motor, may have the steps of: sensing sensor data; determining a target state of the motor depending on the sensor data; generating a motor control signal for controlling the motor depending on a deviation of the motor from the target state to approximate a current state of the motor to the target state; outputting an error signal at an error; and generating, at the occurrence of the error signal, an alternative motor control signal suited to put the motor into a rest state in a controlled manner.

According to another embodiment, a computer program with a program code for performing, when the program is executed on a computer, a method of controlling a motor, may have the steps of: sensing sensor data; determining a target state of the motor depending on the sensor data; generating a motor control signal for controlling the motor depending on a deviation of the motor from the target state to approximate a current state of the motor to the target state; outputting an error signal at an error; and generating, at the occurrence of the error signal, an alternative motor control signal suited to put the motor into a rest state in a controlled manner.

The present invention is based on the finding that a motor controlled by a control means by means of a motor control signal so that it reaches a target state, which is derived from sensor data sensed by a sensor, can be put into a rest state at the occurrence of an error in simple and efficient manner by means of a safety means generating an alternative motor control signal at the occurrence of the error.

By using an alternative, simplified motor control signal in the case of an error to put the motor into a rest state, i.e. typically the standstill, in a controlled manner, it is made possible, in an inexpensive manner and substantially without increase in system complexity, to reach a defined rest state. Doing this, a simplified mode of operation of the motor may additionally be ensured for a short period of time. Dangerous immediate function failures may thus be prevented without having to implement expensive redundancy systems.

In summary, the underlying idea is, instead of redundantly embodying components, to consciously accept a failure and integrate a corresponding fall-back solution into the overall concept. For example, in a regulating system of a motor controller, the failure of a microcontroller may be accepted. The failure is detected, and the motor is switched off in a user-manageable manner by a targeted shutdown via a fixed logic, which may, for example, be hard-wired. Apart from the employment of a second microcontroller, here also the second microcontroller supply integrated in an interface package can also be omitted, for example.

A substantial advantage of the concept may be that the system costs are reduced by saving the redundancy systems on the one hand, and that the space requirement of an implementation is reduced significantly on the other hand.

Moreover, the absolute predictability of the switch-off process in safety-relevant systems, such as power steering, is a huge advantage, because a switch-off behavior leading to a smallest-possible impairment of safety may thus be chosen.

In one embodiment, an electric motor regulation is used for the control of a motor drive of an electronically or electrically assisted steering system, in which a failure of a sub-component may require controlled switch-off of the steering assistance.

By the controlled shut-down of the steering assistance, e.g. taking place in the range of 2-4 seconds, life-threatening driving situations can be prevented from arising. Here, in the regulation of the motor, a cost-intensive integration of a second microcontroller as well as the accompanying supply unit, and moreover also the redundant design of the sensors sensing the steering angle and/or the torque at the steering wheel, can be completely omitted. Here, in the event of an error, the current that is used for driving the motor and the current strength of which is a measure of an additionally generated torque, i.e. the steering assistance, is reduced to zero with a predetermined temporal behavior from the moment of occurrence of the error. The steering assistance is switched off completely within this period of time. Although the integration of an additional safety means in the form of a hard-wired logic may be required for the simple current regulation, a logic hard-wired in such a manner has so little complexity that the loss of complexity of the overall system due to the no longer required redundant design is predominant by far. Overall, a significant reduction in the complexity of the system and the associated costs results, without this having negative effects on the system safety.

For safe switch-off of the electric motor generating the steering assistance, only the relatively inaccurate knowledge of the current with which the electric motor was operated at the time of occurrence of the error may be required.

In another embodiment, Hall sensors measuring the rotor position of the motor as auxiliary sensors if the actual rotor sensor has failed, can therefore additionally be omitted if a voltage measurement of the motor phases is performed instead, so that the functional state of the motor can be deduced on the basis of the voltage conditions. According to the embodiments, the implementation of redundancies can thus be omitted.

In another embodiment, an emergency operation function of the electric steering assistance is ensured with only little overhead by additionally connecting the safety means to a sensor determining the torque at the steering wheel and/or a steering wheel angle, so that even in a failure of a microcontroller controlling the steering assistance simple steering assistance, which is indeed no longer velocity-dependent but nevertheless reduces the forces at the steering wheel, can still be ensured.

In summary, the concept of a steering assistance thus is, instead of redundantly embodying components, to consciously accept a failure and integrate a corresponding fall-back solution into the overall concept. Cost-intensive backup solutions, such as microcontrollers (µC), voltage supplies, additional sensors or locked loops, and complex hand-over algorithms are thereby avoided.

FIG. 1 shows an motor control means 10 comprising a sensor 12, a control means 14, a monitoring means 16, as well as a safety means 18.

The sensor 12 senses sensor data indicating the target state of the motor. This may, for example, be a rotational speed or a torque. The sensor data are communicated from the sensor 12 to the control means 14 calculating a target state of the motor based on the sensor data and comparing the same with a momentary actual state of the motor. The control means 14 calculates a motor control signal suited to control the motor so that it reaches or maintains the target state, so that a possible deviation of the actual state from the target state is compensated for. The motor control signal is provided by the control means 14 at a control signal hand-over point 20.

The monitoring means communicating an error signal to the safety means 18 at the occurrence of an error for example of the sensor 12 or the control means 14 may be connected to the sensor 12 and the control means 14 for the purpose of monitoring the sensor 12 and the control means 14.

When communicating an error signal from the monitoring means 16 to the safety means 18, the safety means generates an alternative motor control signal suited to put the state of the motor into a rest state in a controlled manner. For example, this can mean reducing the motor rotation speed from the momentary rotation speed to zero in a controlled manner or reducing a torque momentarily generated to zero. The alternative motor control signal is also made available by the safety means 18 at the control signal hand-over point 20.

By the motor control means 10, it thus becomes possible to put a motor into a desired rest state in a controlled manner at a failure or malfunction of the control means 14, the sensor 12, or another system component, wherein the functioning of the motor can be partially ensured further for a short period of time, i.e. the motor does not abruptly suspend the operation without warning.

Here, it has to be ensured that from the occurrence of the error signal the motor is only controlled by the alternative motor control signal. In the case of a complete failure of the control means 14, simple superimposition of the motor control signal and the alternative motor control signal, as suggested in FIG. 1, is sufficient, because the control means 14 then can no longer output a motor control signal. If it is ensured that the control means 14 no longer outputs a signal at an error of the sensor 12, simply superimposing the motor control signal and the alternative motor control signal is also sufficient for this scenario.

If one cannot assume that the control means does not output a signal in the event of an error, in an embodiment it also can be ensured by further measures that a control signal is only formed by the alternative motor control signal. For example, the error signal may also be communicated to the control means 14 so that the same interrupts its output in the case of an error.

The manner of how it is ensured that the motor is controlled only by the alternative motor control signal from the occurrence of the error signal on is secondary for the idea of the invention. Hence, every suitable circuit or measure achieving this aim is suited.

On the basis of the subsequent FIGS. 2-6, the functioning of the concept for motor control on the basis of the integration in an electric steering assistance system will be illustrated in the following, wherein at first a system corresponding to the prior art will be described on the basis of FIG. 2 so as to make clear the idea and the resulting advantages for the application in electrically assisted steering systems.

Figure 2:
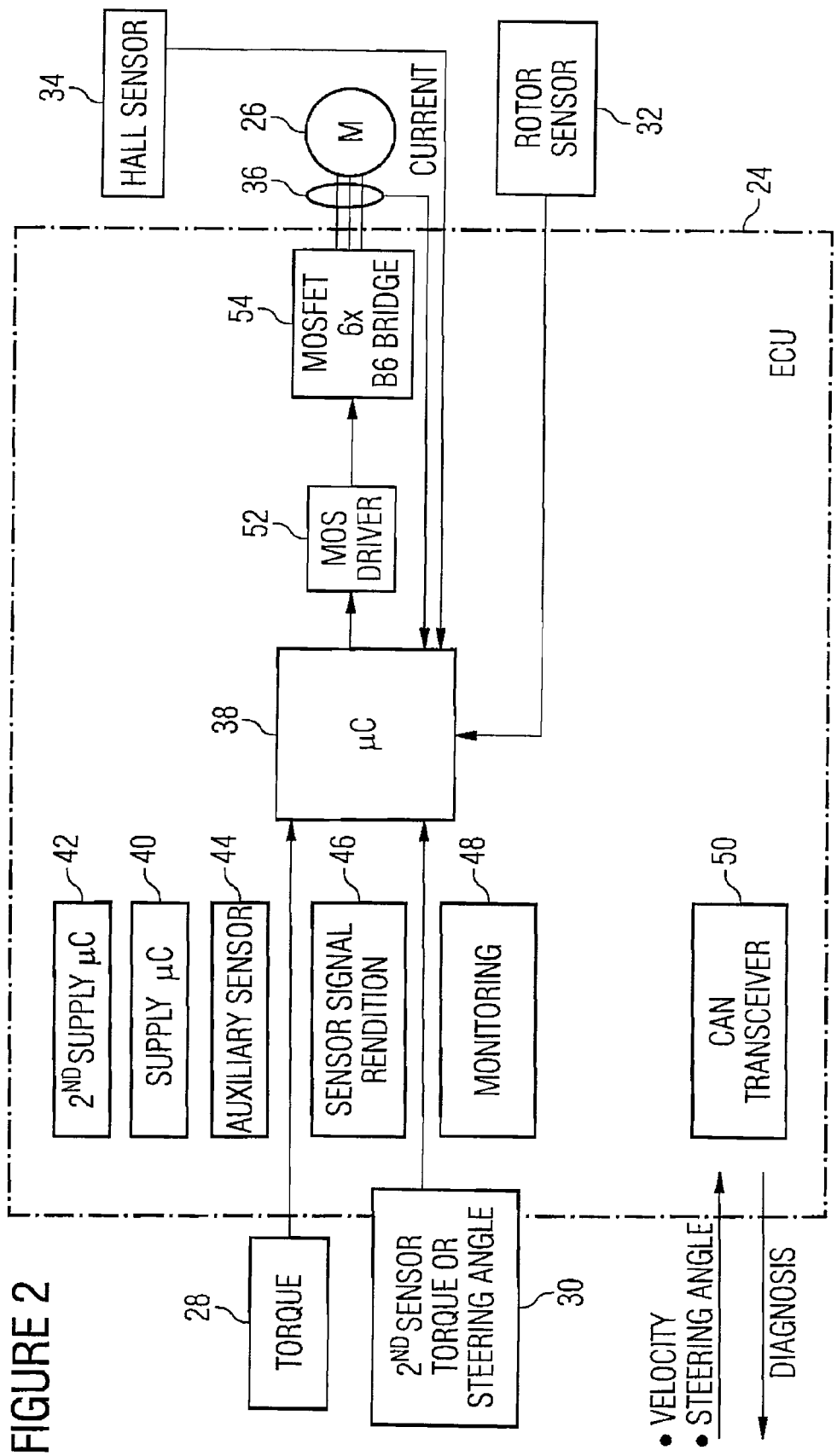
FIG. 2 is an electric steering assistance or power steering according to the prior art.

FIG. 2 shows an example of a system for electric steering force assistance, as it is common at the moment. The steering force assistance means comprises a control means 24 for generating a motor control signal for controlling a motor 26, a torque sensor 28, a control sensor 30 as well as a rotor sensor 32 for controlling the rotor position of the motor 26, one or more Hall sensors 34 as a fall-back plane to the sensor 32, as well as one or more current measurement sensors 36. The control means 24 includes a microcontroller 38, a microcontroller assistance means 40, a redundant microcontroller assistance means 42, auxiliary sensors 44, a sensor signal rendition 46, a monitoring means 48, a CAN transceiver 50 for communication with the vehicle bus, an MOS driver 52 as well as a current control stage 54.

Here, the sensors and/or components not substantial for the understanding of the principle functioning of the steering assistance system are illustrated as functional blocks having no connection to other functional blocks. The functions taken over by these components are only hinted at briefly in the following. The microcontroller assistance means 40 makes available all resources prerequisite to the employment of the microcontroller 38, such as various supply voltages. The redundant microcontroller assistance means 42 is equivalent to the microcontroller assistance means 40 and is provided so as to take over its functions in the event of an error of the microcontroller assistance means 40. The auxiliary sensors 44 serve for the assistance of the functioning of the system, they may, for example, be temperature sensors diagnosing overheating of the circuit or the microcontroller 38, in order to control fans preventing the overheating, for example. The auxiliary sensors 44 may, however, also be sensors necessary for switching over to a redundant system, such as current sensors and/or voltage sensors, which ensure, at the transition from the microcontroller assistance means 40 to the redundant microcontroller assistance means 42, within a locked loop that a supply current which may be required for the operation of the arrangement remains constant. The sensor signal rendition 46 is responsible for rendering the original signal provided from sensors so that the physical measurement quantity that a certain sensor, such as the torque sensor 38, is to determine is extracted from the sensor signal. The monitoring means monitors the error-free functioning of the components concerned in the control of the motor, particularly of the microcontroller 38, the functioning of which may, for example, be controlled by common watchdog techniques. The CAN transceiver 50 serves to exchange information with other vehicle components via the vehicle-internal CAN bus system, in order to obtain the vehicle velocity or communicate the momentary steering angle to other components, for example.

The sensor signal, on the basis of which it is substantially determined with which force or with which torque the motor 26 is to assist a steering process, is provided from the torque sensor 28. To this end, the torque sensor 28 measures the torque exerted on a link between the steering wheel and the motor 26, which is also a measure for the force with which a driver has to hold and/or move the steering wheel. It is the aim of the steering assistance to limit this force, i.e. to prevent a driver from having to actuate the steering wheel with more than a maximum force, which may additionally be velocity-dependent. On the basis of the torque measured by the torque sensor 28, the desired torque assistance the motor 26 is to perform can be calculated. This calculation is performed by the microcontroller 38, for which the same obtains the sensor signal of the torque sensor 28. Moreover, in the shown case, which is based on redundant system design, there is a control sensor 30, which may a torque sensor or a sensor measuring the steering angle, which is also connected to the microcontroller 38, so that the same can access the data of the control sensor 30 at a failure of the torque sensor 28.

The steering assistance the motor 26 is to provide is introduced into the steering mechanism by generating a torque by the motor 26. The motor 26 is a 3-phase driven motor, in which the torque generated by the motor 26 is proportional to the current strength flowing through the field coils. Here, the magnetic field within the motor 26 is made to follow a rotor rotation so that the same is perpendicular to the rotor windings at all times, so that a maximum, but current-strength-dependent torque can be generated. On the one hand, the position of the motor rotor with reference to the field coils is to be measured, which is ensured by the rotor sensor 32, and, on the other hand, the motor current is determined with the aid of the sensor(s) 36. The sensor data of the current sensor 36 and of the rotor sensor 32 are made available to the microcontroller 38, so that it can ensure, in the form of a regulation, that the electrical field and the rotor coils are perpendicular to each other at all times.

The current measurement sensor 36 determining the current impressed on the motor 26 as a field coil current, based on the ohmic measurement principle, serves for further function control. For controlling the current strength and phase location of the three phase-shifted supply currents, the current measurement signal of the current measurement sensor 36 is also applied to the microcontroller 38.

The microcontroller 38 then may calculate a required phase shift or tracking of the phase of the coil current from the data of the rotor sensor 32, the Hall sensor 34, and the current sensor 36 on the one hand, a required current strength to achieve the desired torque assistance by the motor 26, based on the torque measurement value of the torque sensor 28, on the other hand. The required mean current strength can be generated by means of a pulse-width-modulated signal, i.e. with a signal of constant amplitude, which is quickly switched on or off in a temporally variable manner. The MOS driver 52 serves to generate the control current which may be required for the drive of the six power transistors located within the current control stage 54, because it is too large to be able to be generated directly by a microcontroller output 38. Hence, the microcontroller is connected to the current control stage 54 via the MOS driver 52.

Intercepting an error of the conventional steering assistance system shown in FIG. 2 thus is substantially based on a redundant design of the torque-giving sensor and the supply of the microcontroller 38, so that at least at a failure of the torque sensor 28 or of the microcontroller assistance means 40 the normal functioning can be largely maintained. At a failure of the microcontroller 38, however, the signal driving the motor 26 disappears abruptly, so that the steering assistance fails immediately without warning.

In addition, it is to be pointed out that the seamless transition during the operation from a primary to a redundant system, particularly at the transition from the microcontroller assistance means 40 to the redundant microcontroller assistance means 42, is an extremely critical process, for which additional complex regulations not illustrated here have to be implemented.

On the basis of FIGS. 3-6, an application of the motor control means to a steering assistance means, as it is shown in FIG. 2, will be explained in the following. The changes with respect to FIG. 2 substantially consist in adding or removing components, which is why those components already having been described on the basis of FIG. 2 carry the same reference numerals as in FIG. 2, and wherein repeated explanation of the functionality of these components is also omitted in the following figures.

Figure 3:
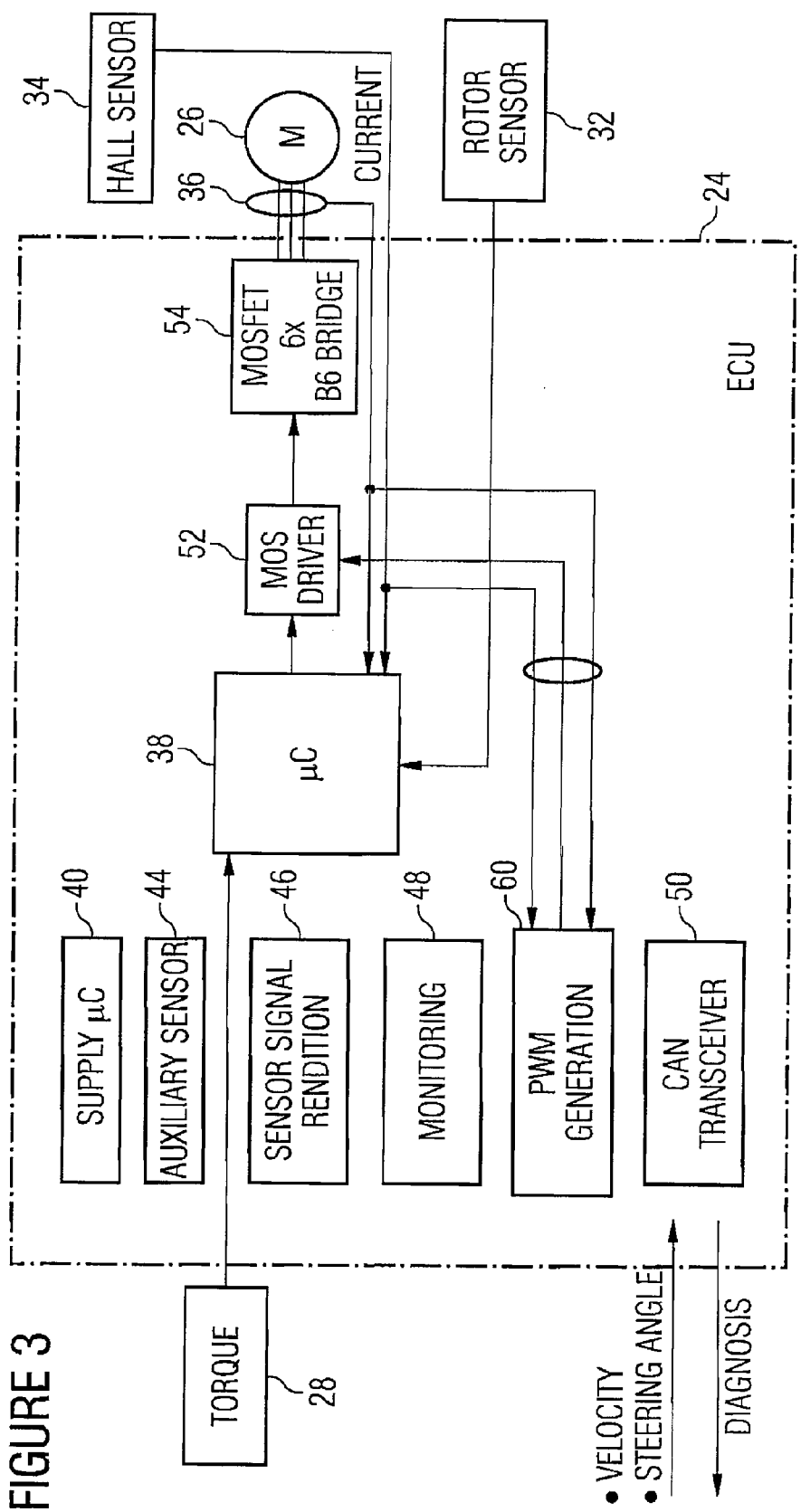
FIG. 3 is an electric steering assistance.

The embodiment shown in FIG. 3 additionally comprises a safety means 60 within the control means 24. As can be seen in FIG. 3, less redundancy of devices may be required (crossed-out blocks) when using a motor control means. In the case of an occurrence of an error detected by the monitoring means 48, it is the task of the safety means 60 to apply a pulse-width-modulated signal to the MOS driver 52, so that the current strength impressed on the motor 26 at the time of the occurrence of the error approaches zero with defined temporal behavior. To this end, the current flowing into the motor 26 has to be measured by the safety means 60, to which end it is connected to both the current measurement sensor 36 and the Hall sensor 34, the signal of which indicates the rotor position.

Thus, if the monitoring means 48 generates an error signal, a pulse-width-modulated signal imparted on the motor 26 via the MOS driver 52 and the current control stage 54, so that it continuously obtains less current, i.e. the servo-assistance of the steering force continuously becomes less, is generated by the safety means 60. Thus, avoiding the sudden drop in steering assistance and the concomitant safety risks, wherein the failure of every sensor as well as of the microcontroller 38 itself can be made compensated for, has been successful in a hardware-saving and efficient manner.

In the above application, it is substantial that the motor 26 is controlled only by means of the pulse-width-modulated signal of the safety means 60 from the occurrence of the error signal on. This may, for example, be ensured by a switch in the MOS driver 52, to which end the same also has to obtain the error signal. Alternatively, the output of the potentially still functional microcontroller 38 may also be switched off by means of the error signal, so that then an addition of the signals in the MOS driver 52 would be sufficient to assure the function. With reference to further alternatives to ensure that the motor 26 is only controlled by means of the pulse-width-modulated signal of the safety means 60 in the case of an error, reference is to be made here to the statements regarding FIG. 1. In this method, the redundant design of the μC means 42 can be omitted.

Figure 4:
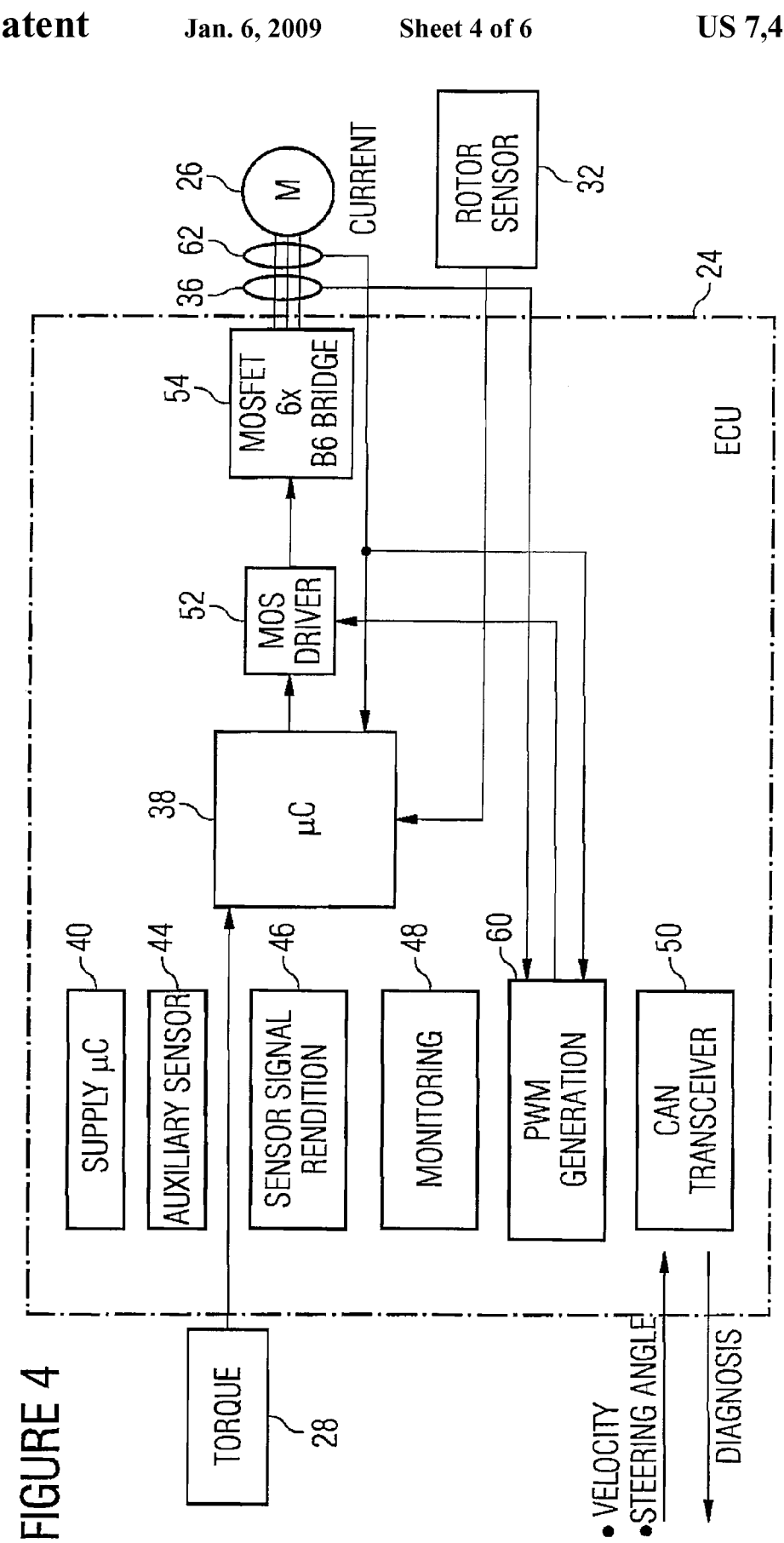
FIG. 4 is a further embodiment of an electric steering assistance.

FIG. 4 shows an embodiment in which the comparably complicated Hall sensor in the motor 26 can be omitted, because a phase voltmeter 62 is integrated into the system in addition to the current measurement sensor 36, so that the current flowing into the motor 26 can be measured by the current measurement sensor 36, wherein the phase voltages at the motor are sensed by the phase voltmeter 62, so that the rotor position of the motor 26 can be deduced on the basis of the current-voltage behavior. The current and rotor position quantities to be treated in a controlled manner in the case of an error are detected by the safety means 60 by the fact that both the current measurement sensor 36 and the phase voltmeter 62 are connected to the safety means 60. In the case of an error, the motor 26 is put into the rest state, as already described on the basis of FIG. 3, wherein all error scenarios can also be intercepted here. In this example, the steering assistance following the steering angle of the driver is omitted.

Figure 5:
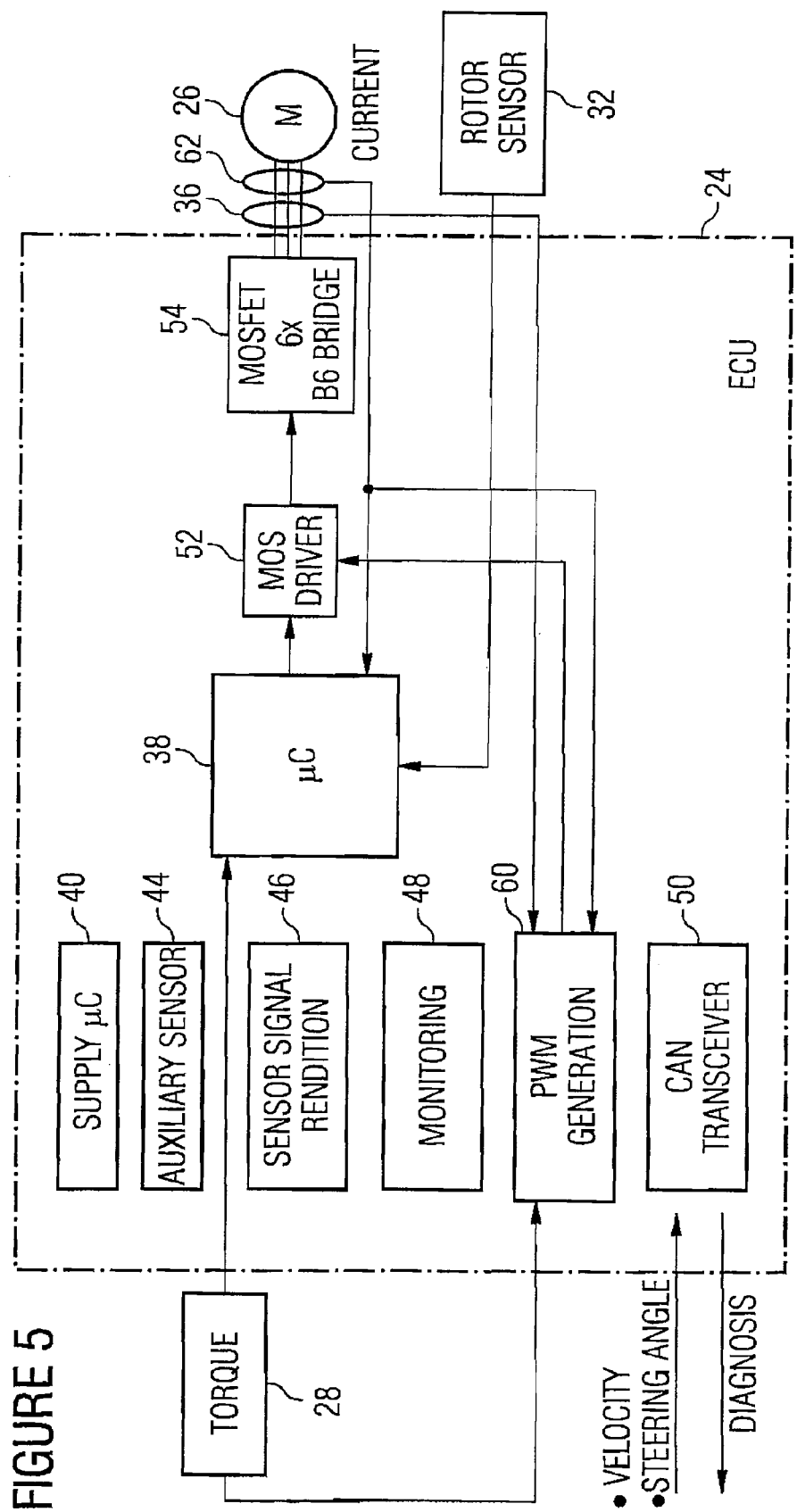
FIG. 5 is an steering assistance means with additional redundancy.

The embodiment shown in FIG. 5 is an extension of the configuration shown in FIG. 4, in which the control means 60 is additionally supplied with a signal from the sensor 28, which usually is a torque sensor, i.e. which describes the desired torque. In addition, this information is made available to the safety means 60, which is why the safety means 60 is connected to the sensor 28. In addition to simple switching-off or controlled shutdown of the steering assistance, in the configuration described, it is possible to provide, at the failure of the microcontroller 38 or the torque sensor 28, a basic, non-regulated steering assistance by means of the safety means 60 on a short-time basis, wherein the regulation is replaced by a control by the safety means 60. Moreover, during a switch-off process or an emergency operation, the steering position may be switched over by a sensor-free commutation (more inaccurate, but sufficient) on a short-time basis, instead of a redundant rotor sensor. The signals of the current measurement sensor 36 and the back-current sensor 62 can be used for this. In this example, the steering assistance can also follow the steering angle of the driver in the emergency operation.

Figure 6:
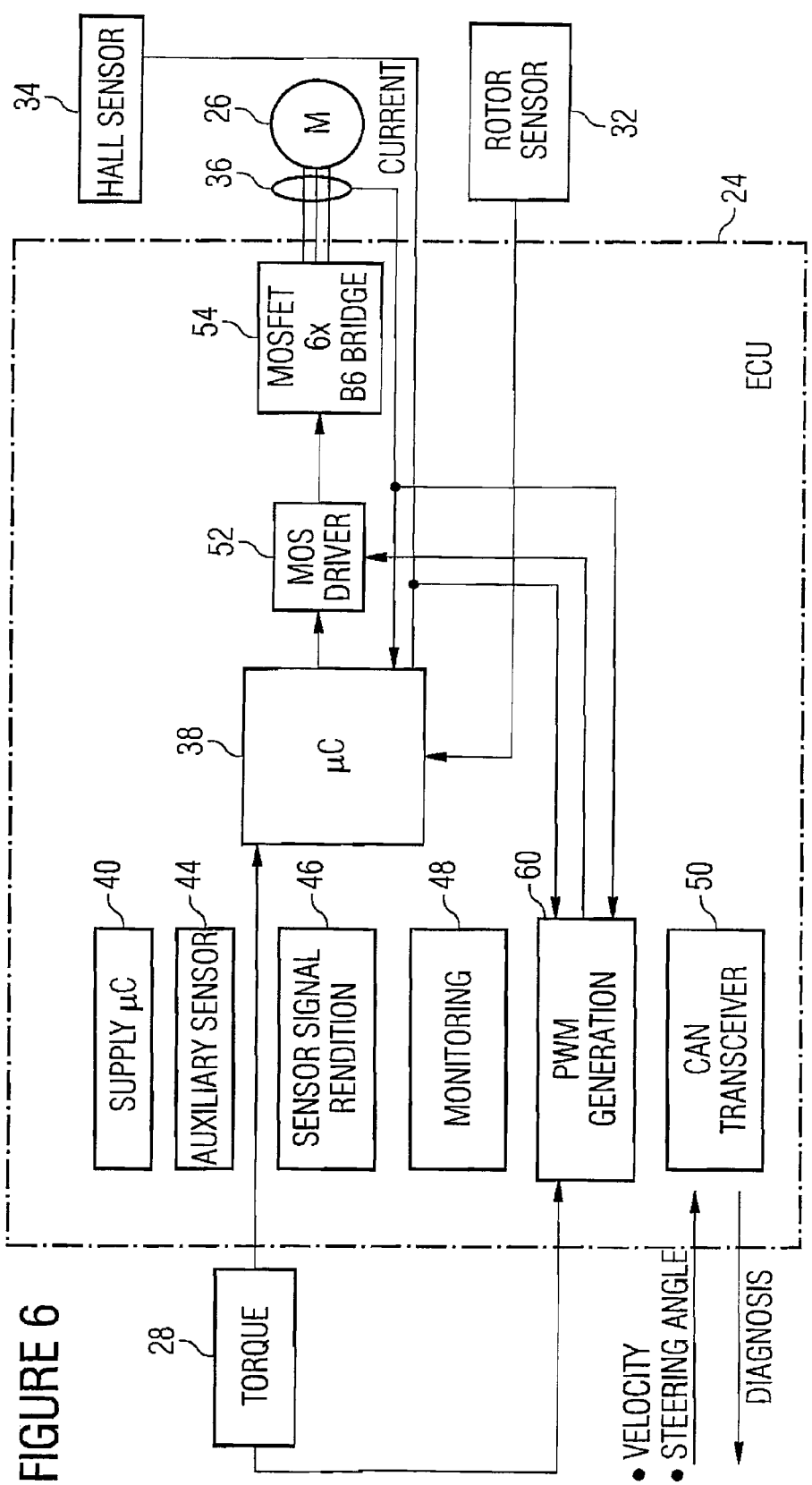
FIG. 6 is a further embodiment of an steering assistance means with additional redundancy.

The example shown in FIG. 6 is a variation of the case already discussed on the basis of FIGS. 4 and 5, wherein the rotor position is measured by one or more Hall sensors in the motor 26 by a Hall sensor 34 in the case of an error, wherein the safety means is also connected to the sensor 28, to obtain steering information during a switch-off process. In this case, the commutation is performed by the combination of the signals of the current measurement sensor 36 and of the Hall sensor 34.

In the above-mentioned examples of a servo-assisted steering, the failure of a microcontroller is consciously accepted. The failure is detected and switched off by targeted shutdown via a hard-wired logic (the safety means 60) in a user-manageable manner. Hence, apart from the employment of a second microcontroller, the second microcontroller supply integrated in the interface package can also be omitted.

Cost-intensive backup solutions, such as microcontrollers, voltage supplies, additional sensors or locked loops, and complex hand-over algorithms are avoided. The simplification of the overall system thus increases the chance of acceptance in the market and may favor the development of a new "steer by wire" market.

The system is exemplarily shown here on the basis of an EPS (electrical power steering) system, but may also be applied to other complex motor controls. This may, for example, be the regulated drive of a conveyor belt that would damage the conveyed goods at an abrupt stop. Moreover, e.g. pump and fan controls may be considered, in which there are numerous scenarios in which at least an emergency operation power for a few seconds still has to be ensured so as to prevent further damage.

The motor state to be achieved at a failure of part of the regulation system does not always have to be the standstill. In a regulated motor supposed to ensure constant conveyor belt velocity under variable loads, a constant current may, for example, be impressed on the motor by the safety means in the case of an error, in order to obtain an approximately constant rotation speed of the motor.

In a desired reduction of the current to zero, the reduction may have any temporal course, i.e. for example proceed in steps of discrete temporal length, or may have a temporally continuous course.

Although the exemplary case of application described on the basis of FIGS. 3-6 has been described on the basis of a special system for driving an electric motor for the steering assistance in vehicles, the concept may also be combined with any other electrically assisted steering. For example, the torque sensor does not have to be directly connected to the microcontroller, it being also possible to make torque information available via the vehicle bus, and thus via the CAN transceiver 50. The regulation of the motor described on the basis of the figures may also be based on physical quantities other than those exemplarily named in the figures.

The error scenarios described on the basis of the figures are only to be understood as exemplary, because all error scenarios within the open-loop and closed-loop control circuit of the electric motor can be intercepted.

Depending on the conditions, the method of controlling a motor may be implemented in hardware or in software. The implementation may be on a digital storage medium, in particular a floppy disc or a CD with electronically readable control signals capable of interacting with a programmable computer system so that the method of controlling a motor is executed. In general, the invention thus also consists in a computer program product with a program code stored on a machine-readable carrier for performing the method, when the computer program product is executed on a computer. In other words, the invention may thus be realized as a computer program with a program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A motor control apparatus to control a motor, comprising:
   a sensor for outputting sensor data;
   a controller for determining a target state of the motor depending on the sensor data, and for generating a motor control signal for controlling the motor depending on a deviation of a current state of the motor from the target state, to approximate the current state of the motor to the target state;
   a monitor for outputting an error signal at an error of the sensor or the controller; and
   a safety controller for generating, at the occurrence of an error signal, an alternative motor control signal suited to put the motor into a rest state in a controlled manner.

2. The apparatus of claim 1, wherein the motor is an electric assistance motor of an electrical steering assistance.

3. The apparatus of claim 1, wherein the safety controller is formed to generate the alternative motor control signal so that a motor control quantity is put from an initial control quantity value into a final control quantity value according to a predetermined emergency rule.

4. The apparatus of claim 3, wherein the motor control quantity is a current or a voltage.

5. The apparatus of claim 3, wherein the safety controller is formed to reduce a momentary current flow as a motor control quantity to zero according to a predetermined reduction rule.

6. The apparatus of claim 3, wherein the safety controller is formed to generate the motor control quantity by means of a pulse-width-modulated signal.

7. The apparatus of claim 1, wherein the sensor is a torque sensor for sensing a torque.

8. The apparatus of claim 7, wherein the torque sensor is formed to sense the torque occurring at the steering wheel of a vehicle.

9. The apparatus of claim 1, wherein the controller includes a calculating unit formed to calculate the motor control signal depending on the sensor data.

10. The apparatus of claim 9, wherein the calculating unit is a microcontroller or an FPGA.

11. The apparatus of claim 1, wherein the controller additionally comprises a motor control sensor circuitry for outputting control data describing the current state of the motor.

12. The apparatus of claim 11, wherein the motor control sensor circuitry comprises a Hall sensor to sense a magnetic field in the motor.

13. The apparatus of claim 11, wherein the motor control sensor circuitry comprises a rotor position sensor to sense a position of the rotor of the motor.

14. The apparatus of claim 11, wherein the motor control sensor circuitry comprises a current sensor to sense a supply current of the motor.

15. The apparatus of claim 11, wherein the motor control sensor circuitry comprises a back current sensor to sense a current flowing out of the motor.

16. The apparatus of claim 1, wherein the motor is a polyphase-driven electric motor.

17. A method of controlling a motor, comprising:
   sensing sensor data;
   determining a target state of the motor depending on the sensor data;
   generating a motor control signal for controlling the motor depending on a deviation of the motor from the target state to approximate a current state of the motor to the target state;
   outputting an error signal at an error; and
   generating, at the occurrence of the error signal, an alternative motor control signal suited to put the motor into a rest state in a controlled manner.

18. A computer program product comprising a program code for performing, when executed on a computer, performs a method of controlling a motor, the method comprising:
   sensing sensor data;
   determining a target state of the motor depending on the sensor data;
   generating a motor control signal for controlling the motor depending on a deviation of the motor from the target state to approximate a current state of the motor to the target state;
   outputting an error signal at an error; and
   generating, at the occurrence of the error signal, an alternative motor control signal suited to put the motor into a rest state in a controlled manner.

19. A method of controlling a motor, comprising the steps of:
   determining a target state of the motor depending on sensor data,
   generating a motor control signal for controlling the motor depending on a deviation of a current state of the motor from the target state, to approximate the current state of the motor to the target state;
   outputting an error signal at an error of the sensor or the controller; and
   generating, at the occurrence of an error signal, an alternative motor control signal suited to put the motor into a rest state in a controlled manner.

20. The method of claim 19, comprising the steps of generating the alternative motor control signal so that a motor control quantity is put from an initial control quantity value into a final control quantity value according to a predetermined emergency rule.

21. The method of claim 20, wherein the motor control quantity is a current or a voltage.

22. The method of claim 21, comprising the step of reducing a momentary current flow as a motor control quantity to zero according to a predetermined reduction rule.

23. The method of claim 20, comprising the step of generating the motor control quantity by means of a pulse-width-modulated signal.

24. The method of claim 19, wherein the torque occurring at the steering wheel of a vehicle is determined.

25. The method of claim 19, wherein a magnetic field in the motor is determined.

26. The method of claim 19, wherein a position of the rotor of the motor is determined.

27. The method of claim 19, wherein a supply current of the motor is determined.

28. The method of claim 19, wherein a current flowing out of the motor is determined.

* * * * *